(12) United States Patent
Jankel (10) Patent No.: US 8,820,063 B2
(45) Date of Patent: Sep. 2, 2014

(54) HYDROELECTRIC POWER GENERATION SYSTEM

(76) Inventor: Paul Jankel, Surrey (GB)

(*) Notice: Subject to any disclaimer, the term of this patent is extended or adjusted under 35 U.S.C. 154(b) by 765 days.

(21) Appl. No.: 12/737,811

(22) PCT Filed: Aug. 18, 2009

(86) PCT No.: PCT/GB2009/002028
§ 371 (c)(1),
(2), (4) Date: Feb. 17, 2011

(87) PCT Pub. No.: WO2010/020779
PCT Pub. Date: Feb. 25, 2010

(65) Prior Publication Data
US 2011/0133464 A1 Jun. 9, 2011

(30) Foreign Application Priority Data
Aug. 21, 2008 (GB) .................................. 0815311.6

(51) Int. Cl.
*E02B 9/00* (2006.01)

(52) U.S. Cl.
CPC . *E02B 9/00* (2013.01); *Y02E 60/17* (2013.01); *Y02E 10/22* (2013.01)

USPC ............................................................ 60/398

(58) Field of Classification Search
USPC ........................... 60/398; 290/43, 54; 405/75
See application file for complete search history.

(56) References Cited

U.S. PATENT DOCUMENTS

| 425,791 | A | * | 4/1890 | Hey | 405/75 |
| 431,540 | A | * | 7/1890 | Hamilton | 405/75 |
| 442,000 | A | * | 12/1890 | Zeitinger | 405/75 |
| 954,999 | A | * | 4/1910 | Roell | 405/75 |
| 4,014,173 | A | | 3/1977 | Keeling | |

FOREIGN PATENT DOCUMENTS

| EP | 0545885 | 6/1993 |
| JP | 10299636 | 11/1998 |
| JP | 11081288 | 3/1999 |
| SU | 589329 | 5/1973 |

* cited by examiner

*Primary Examiner* — Michael Leslie
(74) *Attorney, Agent, or Firm* — J. Bennett Mullinax (57) ABSTRACT

The present invention is directed to a method for the construction of a hydroelectric power generation system and to hydroelectric power generation systems constructed by such a method.

20 Claims, 11 Drawing Sheets

Table 1

| Dam Name | Country | Infrastructure Value $US million | Power Capacity MW | Reservoir Area KM2 | Reservoir Volume MM3 | Dam Height / Head M | Life Time Output GWh | River | Impacts |
|---|---|---|---|---|---|---|---|---|---|
| Ertan | China | 2,384 | 3,300 | 101 | 5,800 | 240 | 1,300,860 | Yalong | DISPLACEMENT |
| Nam Theun II | Laos | 1,227 | 1,070 | 450 | ? | 50 | 421,794 | Theun | |
| Manantali | Mali | 933 | 200 | 477 | ? | 65 | 78,840 | Bafing | DISPLACEMENT |
| Ralco | Chile | 540 | 570 | 34 | ? | 155 | 224,694 | Biobio | DISPLACEMENT |
| Urrá | Chile | 800 | 340 | 74 | ? | 73 | 134,028 | Sinú | |
| Maccagua II | Venezuela | 2,570 | 2,540 | 47 | ? | 72 | 1,001,268 | Caroní | DISPLACEMENT |
| Carruacchii | Venezuela | 2,130 | 2,160 | 237 | ? | 55 | 851,472 | Caroní | |
| Toccoma | Venezuela | 2,000 | 2,160 | 87 | ? | 80 | 851,472 | Caroní | DISPLACEMENT |
| Deriner | Turkey | 711 | 670 | ? | 2,000 | 247 | 264,114 | Coruh | |
| Xiaowan | China | 2,710 | 4,200 | ? | 15,000 | 292 | 1,655,640 | Lancang | |
| Longtan | China | 2,980 | 5,400 | ? | ? | 192 | 2,128,680 | Hongshui | |
| Kameng | India | 611 | 600 | ? | ? | 157 | 236,520 | Bichom | |
| Bujagali Falls | Uganda | 550 | 200 | ? | ? | 30 | 78,840 | Nile | |
| Yaccyrrettá | Paraguay / Argentina | 11,500 | 2,700 | ? | ? | ? | 1,064,340 | Paraná | |
| Average | | 2,260 | 1,865 | 188 | 7,600 | 131 | 735,183 | | |
| Present invention | | 1.5 | 2 | 0 | 0 | 400 | 788 | | No |

Figure 4

Table 2

| Dam Name | Power Capacity MW | Dam Height / Head M | Reservoir Area (1) KM2 | Concrete (2) M$ | Steel (3) M$ | Estimated upstream CO2e (4) MT | Direct CO2 (5) MT | Total CO2 (6) MT |
|---|---|---|---|---|---|---|---|---|
| Ertan | 3,300 | 240 | 101 | 596 | 477 | 769,371 | 1,124,433 | 1,893,804 |
| Nam Theun II | 1,070 | 50 | 450 | 307 | 245 | 396,014 | 5,009,850 | 5,405,864 |
| Manantali | 200 | 65 | 477 | 233 | 187 | 301,126 | 5,310,441 | 5,611,567 |
| Ralco | 570 | 155 | 34 | 135 | 108 | 174,285 | 378,522 | 552,807 |
| Urrá | 340 | 73 | 74 | 200 | 160 | 258,200 | 823,842 | 1,082,042 |
| Maccagua II | 2,540 | 72 | 47 | 643 | 514 | 829,468 | 527,704 | 1,357,172 |
| Carruacchii | 2,160 | 55 | 237 | 533 | 426 | 687,587 | 2,636,294 | 3,323,881 |
| Toccoma | 2,160 | 80 | 87 | 500 | 400 | 645,500 | 972,356 | 1,617,856 |
| Deriner | 670 | 247 | 82* | 178 | 142 | 229,475 | 911,257 | 1,140,732 |
| Xiaowan | 4,200 | 292 | 513* | 678 | 542 | 874,653 | 5,712,355 | 6,587,007 |
| Longtan | 5,400 | 192 | 660* | 745 | 596 | 961,795 | 7,344,456 | 8,306,251 |
| Kameng | 600 | 157 | 73* | 153 | 122 | 197,200 | 816,051 | 1,013,251 |
| Bujagali Falls | 200 | 30 | 24* | 138 | 110 | 177,513 | 272,017 | 449,529 |
| Yaccyrrettá | 2,700 | ? | 330 | 2,875 | 2,300 | 3,711,625 | 3,672,228 | 7,383,853 |
| Average | 1,865 | 131 | 228 | 565 | 452 | 729,558 | 2,536,558 | 3,266,116 |
| Present invention | 2 | 400 | 0 | 0.015 | 0.375 | 531 | 0 | 531 |

(1) where specific value not available, estimated by dividing power capacity by average capacity to reservoir area ratio (Table 9)
(2) estimated at 25% of infrastructure value
(3) estimated at 20% of infrastructure value
(4) (metric tonnes) based upon estimated concrete and steel infrastructure value and Table 4 CO2e Emission Factors
(5) CO2 which is not being absorbed as a result of land not being available to absorb CO2 during the total life of the HEP facility
(6) Estimated upstream CO2e + Direct CO2

* indicates estimate calculated as power capacity MW (Table 2) / average capacity to reservoir area ratio (Table 9)

Table 3

| Traditional HEP Cost Breakdown | |
|---|---|
| Materials | 25% |
| Formwork | 20% |
| Plant Purchase | 19% |
| Plant Operation | 19% |
| Placing & Consolidation of Concrete | 4% |
| Precooling Concrete | 3% |
| Concrete Treatment | 3% |

Source: Concrete Dam Construction
www.dur.ac.uk/~des0www4/cal/dams/cons/consf3.htm Table 4

| CO2e Emission Factors (metric tonnes per million dollars spent) | |
|---|---|
| Activity | CO2e / M$ |
| Concrete Manufacture | 163 |
| Iron & Steel Mills | 1410 |

Source: EIOLCA
www.eiolca.net

Table 5

| Macro Micro Plant Considerations | | |
|---|---|---|
|  | Macro | Micro |
| Site Selection | Significant | Minimal |
| Site Assessment | Significant | Minimal |
| Plant Construction | Significant | Minimal |
| Plant Operation | Minimal | Minimal |
| Plant Decommissioning | Significant | Minimal |

Table 6

| Present invention Cost Breakdown | |
|---|---|
| Steel Pipe | 25% |
| Concrete | 1% |
| Placing & Consolidation of Pipe | |

Table 7

| Time at full Capacity | |
|---|---|
| Present invention | 90% |
| Dams | 50% |

Table 8

| Plant Life Time (years) | |
|---|---|
| Present invention | 50 |
| Dams | 90 |

Table 9

| Average Capacity to Reservoir Area Ratio | 8.19 |
|---|---|

Table 10

| Diffusive Emissions Land Type | Kg CO2 Hectare Day |
|---|---|
| Polar/Boreal wet | 11.20 |
| Cold Temperate | 15.20 |
| Warm Temperate - Moist | 8.10 |
| Warm Temperate - Dry | 5.20 |
| Tropical - Wet | 44.90 |
| Tropical - Dry | 39.10 |
| Average | 20.62 |

Table 11

| Days of year without ice on reservoir | 300 |
|---|---|
| Fraction of Area flooded in first 10 years | 0.2 |

Source: IPCC
www.ipcc-nggip.iges.or.jp/index.html

Figure 7

Table 12 - Results

|  | Total CO2/lifetime output |  |
|---|---|---|
| Dam | kg CO2e / MWh | Dam Name |
| 1 | 1,455.81 | Ertan |
| Not shown | 12,816.36 | Nam Theun II |
| Not shown | 71,176.65 | Manantali |
| 2 | 2,460.27 | Ralco |
| 3 | 8,073.25 | Urrá |
| 4 | 1,355.45 | Maccagua II |
| 5 | 3,903.69 | Carruacchii |
| 6 | 1,900.07 | Toccoma |
| 7 | 4,319.09 | Deriner |
| 8 | 3,978.53 | Xiaowan |
| 9 | 3,902.07 | Longtan |
| 10 | 4,284.00 | Kameng |
| 11 | 5,701.79 | Bujagali Falls |
| 12 | 6,937.49 | Yaccyrrettá |
| Average | 4,442.59 | Average |
| 13 | 673.76 | Present invention |

Table 13

| Plant Name | Power KW/m3 water | Flow m3/s | Power Output Mw | Head m | Tunnel km | Dam m | Aqueducts | Run of River | Storage |
|---|---|---|---|---|---|---|---|---|---|
| Trinafour | 429.52 | 1.16 | 0.50 | 91 | yes | 364w 49h | | | |
| Victoria Falls Station | 778.80 | 1.28 | 1.00 | 165 | | yes | | | yes |
| PRESENT INVENTION | 1,888.00 | 1.06 | 2.00 | 400 | | | | | |
| Loch Ericht | 259.60 | 8.47 | 2.20 | 55 | yes | yes | yes | | |
| Lussa | 547.52 | 4.38 | 2.40 | 116 | | yes | | | |
| Mullardoch | 127.44 | 18.83 | 2.40 | 27 | yes | yes | | | |
| Kilmelfort | 523.92 | 4.77 | 2.50 | 111 | | yes | | | |
| Cuaich | 127.44 | 19.62 | 2.50 | 27 | | yes | | | |
| Lednock | 429.52 | 6.98 | 3.00 | 91 | yes | yes | yes | | |
| Achanalt | 94.40 | 32.84 | 3.10 | 20 | | yes | | yes | |
| Lairg | 47.20 | 74.15 | 3.50 | 10 | | 427w 12h | | yes | |
| Lubreoch | 141.60 | 28.25 | 4.00 | 30 | | 530w 39h | | | |
| Dalchonzie | 136.88 | 29.22 | 4.00 | 29 | yes | yes | | | |
| Sron Mor | 217.12 | 23.03 | 5.00 | 46 | | yes | | | |
| Foyers Falls | 509.76 | 9.88 | 5.04 | 108 | yes | yes | | | |

Table 14

| Dam Name | Project Financing $US million | Power Output MW | Reservoir Area hectares | Reservoir Area square km | Reservoir Volume million, cubic m | Dam Height (m) | Country |
|---|---|---|---|---|---|---|---|
| Ertan | 2384 | 3300 | 101 | 101.0 | 5800 | 240 | China |
| Nam Theun II | 1227 | 1070 | 45000 | 450.0 | | 50 | Laos |
| Manantali | 933 | 200 | 47700 | 477.0 | | 65 | Mali |
| Ralco | 540 | 570 | 3400 | 34.0 | | 155 | Chile |
| Urrá | 800 | 340 | 7400 | 74.0 | | 73 | Chile |
| Maccagua III | 1970 | 2540 | 4740 | 47.4 | | 72 | Venezuela |
| Carruacchii Dam | 2130 | 2160 | 23680 | 236.8 | | 55 | Venezuela |
| Toccoma Dam | 2000 | 2160 | 8734 | 87.3 | | 80 | Venezuela |
| Deriner | 711 | 670 | | | 2000 | 247 | Turkey |
| Xiaowan | 2710 | 4200 | | | 15000 | 292 | China |
| Longtan | 2980 | 5400 | | | | 192 | China |
| Kameng | 611 | 600 | | | | 157 | India |
| Bujagali Falls | 550 | 200 | | | | 30 | Uganda |
| Yaccyrrettá | 11500 | 2700 | | | | | Paraguay / Argentina |
| Sungai Selangor III | 790 | | | | | | Malaysia |
| Pangue | | 400 | | | | | Chile |

HYDROELECTRIC POWER GENERATION SYSTEM

The present invention is directed to a method for the construction of a hydroelectric power generation system and to hydroelectric power generation systems constructed by such a method.

Currently, a number of fundamental problems limit the ability to construct and use hydroelectric power generation systems.

Typical hydroelectric power generation systems require the construction of a dam in a valley in the path of a river. Water flow in the river then causes water to back up, the water level to rise, and the resultant head of water is used for hydroelectric power generation between the top of the water level and the base of the dam.

Such hydroelectric power generation systems require a large area of land to be used, incur substantial construction costs, affect downstream water flow, have a substantial visually damaging effect upon the area of the dam and resulting reservoir area, and have a substantial and damaging effect on downstream plants and wildlife due to the silt which previously ran down the full length of the river being collected in the reservoir and being prevented from flowing downstream.

An alternative is run-of-the-river low 'head' hydroelectric power generation systems which do not require a dam to be built but which do require an extremely large volume of water to flow through them in order to generate sufficient electrical power to warrant their construction. These also have disadvantages and in particular slow the water flow rate in the river and also cause a substantial disfigurement to the river. Although run-of-the-river systems can be built to use only a small portion of the water flowing in a river, the power output is small.

The conventional hydroelectric power generation systems also fail to take advantage of water sources that provide a large potential energy such as mountainous waterfalls and other freefalling water sources. These water sources are particularly useful since they can provide a large vertical drop, and the diversion of water to a hydroelectric power generation system in its journey to the bottom of the vertical drop need not cause any adverse environmental effect.

Conventional hydroelectric generation has several problems.

1) Land Use: There is a shortage of both topographically suitable and available sites for dams in the developed world. Land is a scarce and valuable resource; wherever a dam is built there will be considerable land loss.
2) Water extraction: Low 'head' hydro schemes, which for example encompass conventional run-of-the-river designs, are forced to use huge amounts of water to generate enough power to economically warrant their construction. This usually involves blocking river navigation. Dams completely block rivers and use all of the river flow to generate electricity.
3) High expenditure for dams and infrastructure: In all cases of commercial hydroelectric generation there is a large capital investment in concrete and steel. Avoiding this expense would be a huge improvement from both an economic and environmental perspective. There is also unmeasured carbon expenditure in the construction of large-scale hydroelectric projects.
4) It is widely accepted that conventional hydroelectric power generation systems take at least eighty percent of their operating lifespan to repay their construction costs.
5) Surface piping: This is environmentally damaging and impossible to install on sheer cliffs and steep inclines.
6) Plant replacement: In many large-scale hydroelectric schemes the turbine generators are built into the foundations of the dam, making it either difficult or impossible to replace them. This naturally leads to a degradation of the efficiency over time, of such systems.
7) Bio-Diversity in the local eco-system: As mentioned above, conventional dams and run of the river schemes require the harnessing of most if not all of a water source. This blocks rivers to local wild life. Water extraction and its effect on bio-diversity is a growing concern globally and is a limiting consideration for a new hydroelectric project.

Furthermore, there are numerous mountainous and steeply inclined location with natural falling water where there is no capacity to dam or build a run-of-the-river scheme. The present invention seeks to make use of such locations. Such localities (e.g. mountainous localities) are also often far from a conventional national or local power grid, and the present invention seeks to overcome this problem by providing a hydroelectric power generation system which can be installed in such locations and connected to a power grid such as a local or national power grid.

Relevant prior art includes JP 11081288, U.S. Pat. No. 4,014,173, SU 589329 and JP 10299636. JP 11081288 discloses a system in which water is passed from a water source (W) at a first height ($h_1$) over an electricity generating turbine (1) to a water storage compartment (15) of a tank (13) at a second height ($h_2$). A siphon effect is then used to remove the water from the water storage compartment, returning it substantially to the first height ($h_1$) from which it then exits to the water source at the second height ($h_2$). As will be noted, siphons rely upon hydrostatic pressure to drive water. Bernoulli's equation describes the action of siphons and can be used to derive the maximum height and flow rate of a siphon, and confirms that the maximum possible height of a siphon is about 10 meters, and the greater the height the slower the velocity of water flow in the siphon. Thus, this system has fundamental limitations in terms of the vertical drop that it can accommodate and the subsequent siphoning of water away from the water storage compartment (15) of the tank (13).

U.S. Pat. No. 4,014,173 discloses a dam system in which a power turbine is driven by the head of the dam, water being conveyed from a height at the bottom of the dam (below the surface level of river 12) and then returns it to a height above the surface level of river 12.

SU 589329 discloses an underground hydroelectric system in which a conduit (3) carries water from a reservoir down to a turbine and then via a suction tube to a lower reservoir.

JP10299636 discloses a run-of-the-river water mill system.

As noted above, such prior art systems are either limited in the water sources which they are able to use, or result in substantial adverse environmental impact by e.g. requiring the construction of dams and thus adversely affecting water flow downstream of the dam.

Furthermore (and as discussed below), the prior art systems require a relatively high water flow in order to generate a given amount of power, have a low power output per cubic meter of water which passes through them, and the total carbon dioxide output per megawatt hour of electricity generated over the lifetime of the hydroelectric facility is high as compared to that of the present invention.

The present invention seeks to overcome the prior art disadvantages. According to the present invention there is provided a method of construction of a hydroelectric power generation system in an environment comprising a water source which flows from a first height to a second height, the first height being at least 10 meters above the second height, the method comprising the steps of:
(i) constructing an underground power cavern at a location adjacent said water source at said second height;
(ii) performing directional drilling to define a first tunnel from said underground power cavern to a water source location at or adjacent said water source at said first height, said first tunnel having a diameter no greater than 6 meters;
(iii) installing piping in said first tunnel to define a first conduit which in-use conveys water from said water source location to said underground power cavern;
(iv) constructing a second conduit from said underground power cavern to said water source at or below said second height;
(v) performing directional drilling to define a second tunnel from said underground power cavern to a power grid;
(vi) installing an at least one electricity generating turbine in said underground power cavern in fluid flow communication with said first tunnel and said second conduit;
(vii) installing an at least one electricity cable in said second tunnel connecting said at least one electricity generating turbine to said power grid; and
(viii) when said water source location is not in fluid flow communication with said water source at said first height, placing said water source location in fluid flow communication with said water source at said first height.

Apart from the penstock and physical access points, the rest of the construction is subterranean. This is intentional to reduce the system's environmental impact. This in turn facilitate an easier permissions process in environmentally sensitive areas, and indeed allows the construction of a hydroelectric power generation system in areas which would otherwise be unsuitable for other (prior art) hydroelectric power generation systems.

The present invention creates an extremely high 'head' of water at the bottom of the first tunnel, up to approximately forty atmospheres of pressure. One objective of the present invention is (as detailed below) to reduce water extraction to a minimum: As one doubles the 'head' of water one halves the water required to produce the same power.

By focusing on waterfalls and free-falling water sources, the present invention further reduces the impact on local bio-diversity. Water extraction is a sensitive issue for any aquatic river life. In designated 'areas of outstanding beauty' such as national parks, the quantity of water extracted from any water source may be limited by purely aesthetic factors. The present invention maximises power output in relation to the quantity of water flowing through the system. Consequently, only a small percentage of the water flow of any given water source needs to be extracted. Extracted water is returned to the water source downstream at or below the second height.

Figure 9:
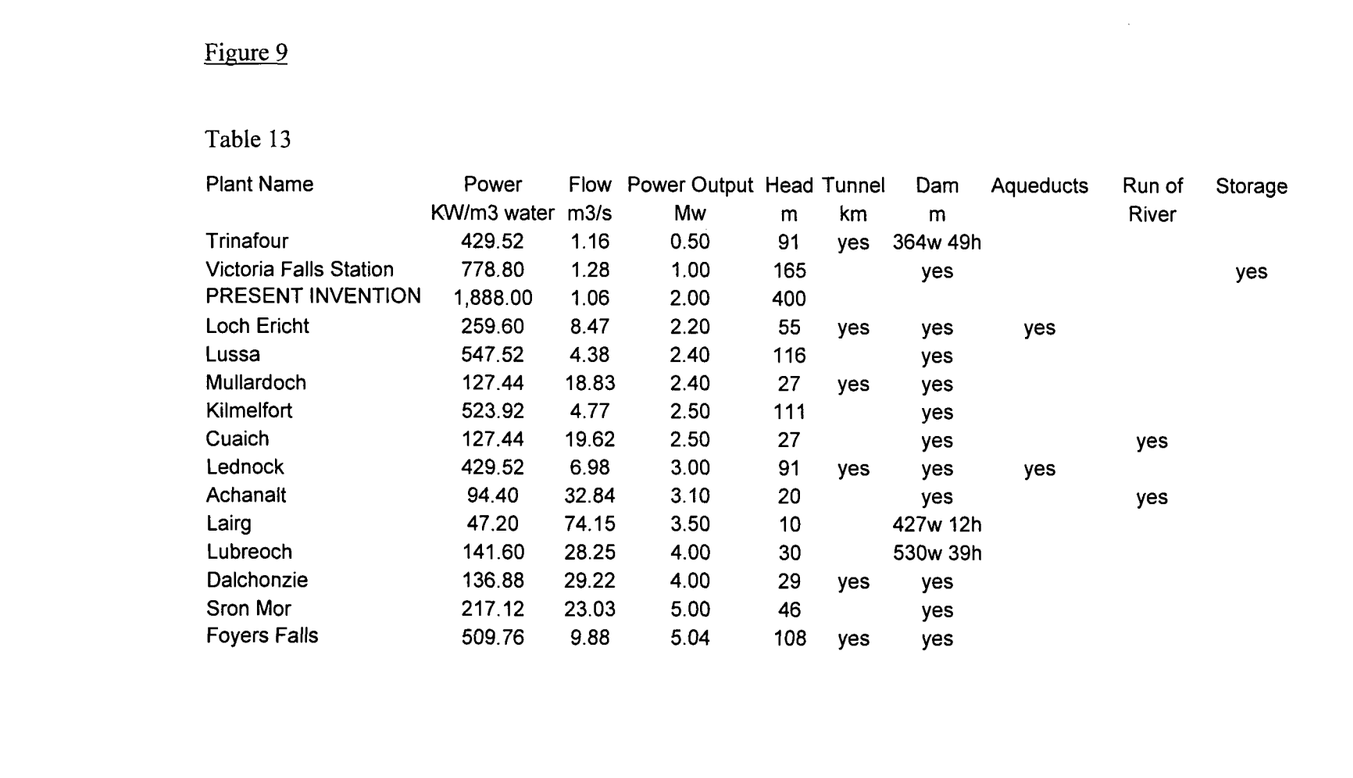
FIG. 9 shows Table 13 which details the power output in KW per cubic meter of water for a range of hydroelectric power generation facilities.
Figure 10:
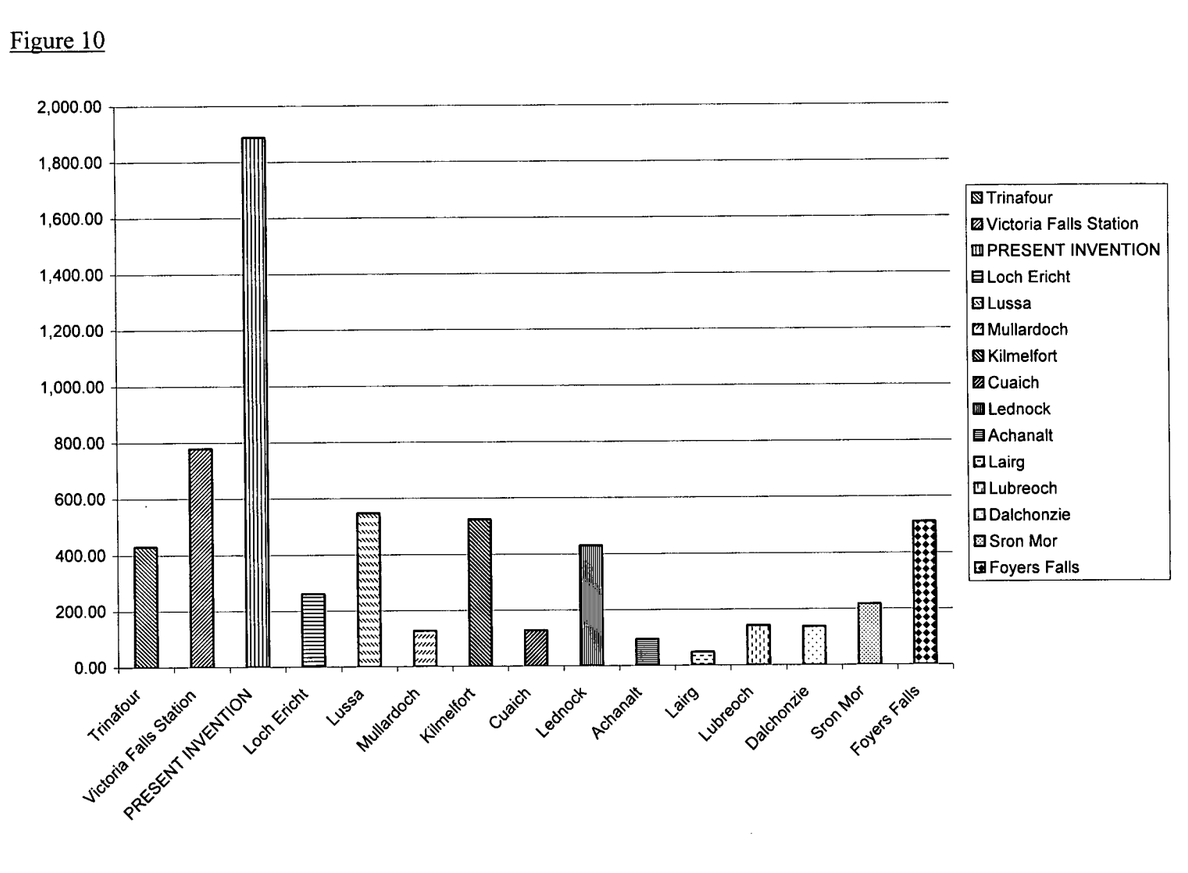
FIG. 10 is a graphic representation of the data shown in Table 13. Y-axis is power in KW/m³ water.

As can be seen from the results shown in FIGS. 9 and 10 (below), the present invention provides a substantial improvement over existing prior art hydroelectric power generation facilities in terms of the electrical power output achieved per cubic meter of water used. This is particularly useful in view of potential future changes legislation which will result in a charge being made per unit volume of water used and which will thus reward those who minimise their water usage.

Preferably, the first height is at least 50 meters above the second height. Preferably, the first height is at least 100 meters above the second height. More preferably, the first height is at least 200 meters, more preferably at least 250 meters, more preferably at least 300 meters, more preferably at least 350 meters, more preferably at least 400 meters above the second height, more preferably at least 450, 500, 550 or 600 meters above the second height.

Preferably the first conduit has a flow capacity of at least 1 $m^3$ per second. In certain embodiments, the first conduit has a maximum flow capacity of less than 2 $m^3$ per second. In certain embodiments, the first conduit has a flow capacity of at least or up to 2, 3, 4, 5 or 6 $m^3$ per second.

Preferably the water source at the first height is a free running water source such as a river. Obviously, other water sources such as lakes which have water flowing into and out of them can be used.

Preferably the method also comprises the step of defining a penstock at the water source location. Penstocks can be constructed with filters and flow control devices to filter out large objects which might otherwise block or damage the first conduit or the at least one electricity generating turbine and to control flow into the first conduit.

Preferably, the penstock additionally comprises vortex prevention means.

Preferably, the first tunnel has a diameter no greater than 5, more preferably no greater than 4, more preferably no greater than 3, most preferably no greater than 2 meters.

Preferably, the piping installed in the first tunnel to define the first conduit is installed to define a single pipe. However, the absolute need for this may vary depending upon the type of rock which defines the first tunnel. For example, sections of tunnel which are defined by very non-porous rock may not need to have piping installed, whereas other sections which are defined by less dense and more porous rock will require piping to be installed.

Preferably, the piping (particularly for the first conduit) is pressure piping For example, with a 400-meter head (i.e. difference between the first and second heights) a grade X52 API 5L (PSL1) Steel piping (Corns Steel, UK) can be used. This piping can accommodate an internal pressure of 40 atmospheres using a constant thickness of 12.7 mm. The piping is then preferably covered with three layer outer protection in the form of a 3-layer polyethylene or polypropylene coating, with a waterproof layer protecting the internal surface of the piping to improve longevity. During construction, once piping has been welded together it is then x-rayed to detect any imperfections or fractures in the weld joint and to confirm that the joint will be capable of withstanding the in-use pressure. A failed weld joint would, of course, lead to in-use water pressure breaching the joint, in turn leading to water leakage and a reduction in overall pressure and power generation. Sleeves are then used to cover the weld and are heated to shrink them around the weld joints.

Other forms of piping will be readily apparent to a person of ordinary skill in the art and their suitability determined according to the parameters of the construction to be made. For example, according to the head and internal pressure, it may be possible to use carbon based piping such as polypropylene piping. For example, glass reinforced pipe (GRP) may be used.

Preferably, the first tunnel is of a constant diameter along its length. Preferably pressure piping is used in the first tunnel having constant internal and external diameters (for example, the X52 API 5L (PSL1) Steel piping (Corns Steel, UK)).

Alternatively, the piping may have a constant internal diameter but vary in thickness, i.e. a variable external diameter, the pipe thickness being appropriate to the pressure which in-use is exerted by water passing through the piping. This may provide for a cost-saving as compared to using pressure piping along the full length of the first tunnel. For example, pressure piping may not be required at the top of the first tunnel (i.e. adjacent the water source location), whereas at the bottom of the first tunnel (i.e. adjacent the underground power cavern) the in-use pressure exerted by the water is very substantial and thus requires an appropriate pressure piping.

Alternatively, the piping may have a variable internal diameter. Thus, the internal and/or external diameter of the piping may be varied in order to allow it to contain the in-use water pressure.

Preferably, the average angle from the horizontal of the first tunnel between the underground power cavern and the water source is 22-35 degrees. Preferably, the angle from the horizontal of the first tunnel between the underground power cavern and the water source varies between 22 and 35 degrees. Thus, the angle of the tunnel may vary from section to section of the tunnel, but preferably remains within the range of 22-35 degrees from the horizontal. The angle is preferably determined over a distance of at least 5 meters, more preferably at least 10, 15, 20, or 25 meters, more preferably still at least 50 or 100 meters. This is particularly the case where the piping is steel piping.

Other forms of piping may permit different ranges of angle from the horizontal. Thus, for example, it may be appropriate for the average angle from the horizontal of the first tunnel between the underground power cavern and the water source to be up to 45 degrees, preferably between 22 and 45 degrees. As above, preferably the angle varies between those values. Preferably, the angle is determined over a distance of at least 5 meters, more preferably at least 10, 15, 20, or 25 meters, more preferably still at least 50 or 100 meters. Preferable forms of piping for such increased ranges of angle include carbon based pipe such as GRP.

Preferably, the piping lengths do not exceed 0.6 degrees of turn assuming a diameter of about 1 meter and a pipe length of 10 meters.

By retaining the angle of the first tunnel within the given range of 22-35 degrees from the horizontal a number of advantages are achieved. In particular, the piping which is installed is conveniently seated and maintained in position by gravity rather than exerting overly large amounts of compressive force upon the next section of pipe below. Further, construction is assisted as gravity assists pipe placement.

The arrangement of the second water conduit need not be a buried pipe and is simply required to in-use return water to the water source at or below the second height. Thus, for example, it may comprise a buried pipe. Alternatively, it may a pipe located on the surface.

As will be seen from the specific embodiment, the present invention provides a substantial environmental improvement when compared to prior art hydroelectric power generation systems, the total $CO_2$ output per megawatt hour over the total life of the hydroelectric power generation facility being significantly lower than that of comparable existing facilities.

In addition, it is particularly desirable to obtain the maximum possible power output from a given unit volume of water—environmental legislation initiatives are proceeding which will result in the levying of a charge or tax on each unit volume of water which is removed from a water supply, thus encouraging conservation of water sources.

The present invention achieves a substantially larger power output per unit volume of water than prior art hydroelectric power generation systems, and thus provides for a significant improvement over the prior art.

Furthermore, the low construction costs achievable with the present invention can allow the repayment of construction costs within a much shorter period of time than current hydroelectric power generation systems, and thus allow for a substantially improved return on investment and thus also encourage and allow construction of hydroelectric power generation systems in locations which would not previously have been seen as being economically viable or attractive.

Electricity generating turbines are well known in the art and suitable turbines will be readily apparent to one of ordinary skill in the art. Preferably, at least one electricity generating turbine is a Pelton turbine.

Preferably, the total power output of the at least one electricity generating turbine is no greater than 5 Megawatts. In certain embodiments, the total power output of the at least one electricity generating turbine is greater than 5 Megawatts.

The total power output carried in the second tunnel by the at least one electricity cable from the at least one electricity generating turbine to the power grid may in practice be limited by the resistance of the at least one electricity cable generating heat, and the need to effect cooling in the second tunnel. Obviously, heat generation can be reduced by increasing voltage and decreasing amperage or by using an at least one electricity cable which has a lower resistance, but a general limit to the convenient and practical power capacity of the at least one electricity cable may be reached. As such, the total power output of the at least one electricity generating turbine may be no greater than 5 Megawatts. Preferably, it is no greater than 4 megawatts.

Preferably, the underground power cavern is fabricated with a removable roof covering. For example, the roof covering may be a concrete roof cover, in turn covered by soil such that plants can grow on top of the underground power cavern. In this way, the underground power cavern can have a minimal environmental and aesthetic impact, and can also allow for relatively convenient access whenever the at least one electricity generating turbine subsequently has to be replaced—electricity generating turbines are very substantial pieces of equipment and as noted above replacing them in a conventional hydroelectric dam facility can be particularly difficult. By providing a removable roof covering, the roof can be removed and convenient access gained to the underground power cavern—a crane can then for example be employed to lift out an existing electricity generating turbine and lift in a replacement electricity generating turbine. The roof covering can then be put back in place and for example plants and soil put back on top of it. Such work may only be required once every fifty years or more, and as such is an acceptable maintenance, particularly for the increased longevity which it provides the facility.

Preferably, the underground power cavern of step (i) is constructed by first constructing an excavation cavity from which the drilling, installation and construction of steps (ii)-(vii) can be conveniently performed, and then placing over it a roof covering, thus defining the underground power cavern.

The present invention also takes into account the practicalities of transmitting generated power to the power grid, for example a local or national power grid. By using directional drilling to make an underground conduit for electricity cables, the environmental impact is further minimised.

Preferably, the method additionally comprises the step of connecting the at least one electricity generating turbine to a drinking water production facility in order to power the drinking water production facility. Preferably, the method additionally comprises connecting the second conduit or the underground power cavern to a drinking water production facility so as to provide it with both water and electricity for drinking water production.

Preferably, the water source is water flowing to a waterfall or to a free falling location.

In an alternative embodiment, the water source is glacial meltwater, i.e. the hydroelectric power generation system is constructed so as to use glacial meltwater as a water source. Preferably, the power which is generated is used to power a refrigeration system. Preferably, the refrigeration system is a refrigeration system for a glacier. Thus, glacial meltwater can be used to generate power which is used to cool the glacier, thus resulting in slower melting of the glacier. Preferably, heat from the refrigeration system is conducted to the flowing meltwater as it passes to or through the second conduit such that it is carried away from the glacier and does not cause heating of the glacier.

Thus the present invention overcomes numerous technical problems:

1) Land use: The present invention avoids the need for large-scale damming; consequently no land is lost to damming.
2) Water extraction: The present invention purposefully creates ultra high pressure to reduce required water flow through it to a minimum. The present invention has a very high ratio of power generated to water extracted compared to existing designs of hydroelectric power generating systems.
3) High capital infrastructure build cost: By avoiding damming or the huge capital investment required to capture hydroelectricity from low 'head' systems, the present invention makes hydroelectric power generation plant construction considerably less expensive. The reduction in the use of concrete and steel relative to power output also reduces the carbon emitted in the manufacture of the systems components.
4) Surface Pipe Construction: By using directional drilling to create an underground pipeline, the practical problems of surface construction of a pressurized pipe are avoided. The weight of pressurized pipe alone makes it impossible to construct on the surface, for example around the contours of a cliff face. Further surface constructions may face topographical features which would produce air pockets inside the pressurized pipe. The present invention creates an effective straight line for the water flow, reducing friction to a minimum, and improving efficiency of power generation from extracted water to a maximum. By holding the pressurized pipe in place inside a bored tunnel, a much heavier weight of pipe can be accommodated than with conventional surface piping; this in turn allows higher pressures to be created at the bottom of the tunnel than would be possible with surface pipes, which have to be held in place securely, just to support their own weight.
5) Plant replacement: The present invention purposefully leaves the turbine room easily accessible so that over time the turbine can quickly be replaced. This is particularly useful since turbine technology and efficiency improves over time. This also helps avoid the huge expense faced replacing a turbine in the unlikely event of catastrophic failure.
6) Biodiversity: The present invention is intended to use water sources such as waterfalls where biodiversity will not be affected.
7) The present invention almost completely avoids surface or visible environmental contamination.
8) Construction is designed to reduce the risk to human life (a common problem with conventional hydro designs) by employing directional drilling, which prevents the need for humans to be 'underground' during construction. This is further enhanced by the medium to small scale of the systems of the present invention.
9) Decentralised power production—the ability to construct systems of the present invention for small communities reducing their dependence upon electrical power from a central (and often unreliable) grid supply.

Also provided according to the present invention is a hydroelectric power generation system in an environment comprising a water source which flows from a first height to a second height, the first height being at least 10 meters above the second height, the hydroelectric power generation system comprising:

(i) an underground power cavern at a location adjacent said water source at said second height;
(ii) a first tunnel from said underground power cavern to a water source location at or adjacent and in fluid flow communication with said water source at said first height, said first tunnel having a diameter no greater than 6 meters;
(iii) piping in said first tunnel to define a first conduit which in-use conveys water from said water source location to said underground power cavern;
(iv) a second conduit from said underground power cavern to said water source at or below said second height;
(v) a second tunnel from said underground power cavern to a power grid;
(vi) an at least one electricity generating turbine in said underground power cavern in fluid flow communication with said first tunnel and said fluid flow path; and
(vii) an at least one electricity cable in said second tunnel connecting said at least one electricity generating turbine to said power grid.

The above preferred aspects of the above method apply equally to the above hydroelectric power generation system.

The present invention will be further apparent from the following description which shows with reference to the accompanying figure by way of example only one form of construction of a hydroelectric power generation system, and a hydroelectric power generation system made by same. Of the figures:

FIGS. 3-6 show Tables 1-11 which list figures and calculated figures for various dams and the hydroelectric power generation system of the present invention;

Figure 1:
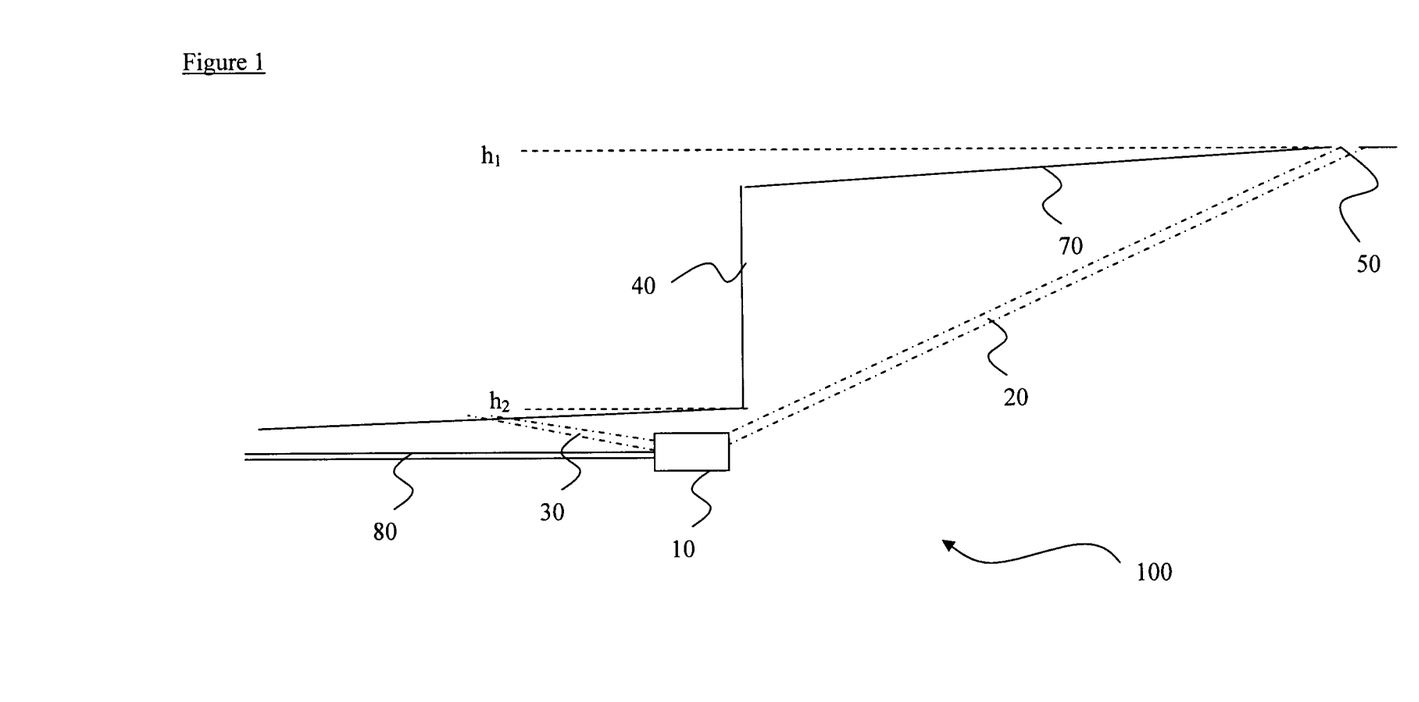
FIG. 1 shows a schematic cross-section view of a general construction scheme for a hydroelectric power generation system of the present invention.

A location for hydroelectric power generation facility 100 is determined according to the height of available waterfalls and free water drops, the flow of water, rock hardness, rainfall and demand for electricity. In the present embodiment, a waterfall 40 is available with a vertical drop of approximately 380 meters. A penstock 50 is constructed adjacent river 70 at a height $h_1$.

At the base of waterfall 40 at height $h_2$, river 70 continues. The height difference between $h_1$ and $h_2$ is 400 meters.

Power cavern 10 is constructed adjacent the base of waterfall 40 by digging an excavation cavity. Concrete walls are inserted to establish a cavern (albeit without a roof). In other embodiments, concrete walls are inserted into power cavern 10 once all drilling of tunnels has been completed.

A directional driller is then lowered into the power cavern 10 and directional drilling is performed using the directional driller from power cavern 10 to define tunnel 20 to penstock 50. Drilling debris is collected and removed from power cavern 10. Tunnel 20 covers a horizontal distance of 737 meters at an average angle to the horizontal of about 28.5 degrees, varying between 22 and 35 degrees, and having a total length of about 920 meters. The directional driller is then reversed back to the power cavern 10.

Tunnel 20 has a diameter of 2 meters and pressure piping with an internal diameter of 1 meter is used, allowing an in-use flow rate of one cubic meter per second. In other embodiments, tunnel 20 has a diameter of 1.3 meters and pressure piping with an internal diameter of 1 meter and a pipe thickness of 0.1 meters is used.

A first section of grade X52 API 5L (PSL1) (Corus Steel, UK) pressure piping is then inserted at the top of tunnel 20 at penstock 50 and slid down to the bottom at power cavern 10. Additional sections of pressure piping are then inserted from the top of tunnel 20 at penstock 50 and slid down to mate with the previously inserted section of pressure piping. Once inserted, the sections of pressure piping are welded together, X-rayed to ensure they are fault-free, and sleeves placed over them and heat-shrunk to effect final sealing and protection, thus defining a first conduit. The pressure piping has a constant internal and external diameter. Thus, the thickness and thus the strength of the pressure piping is appropriate for the in-use pressure which will be exerted upon it.

Figure 2:
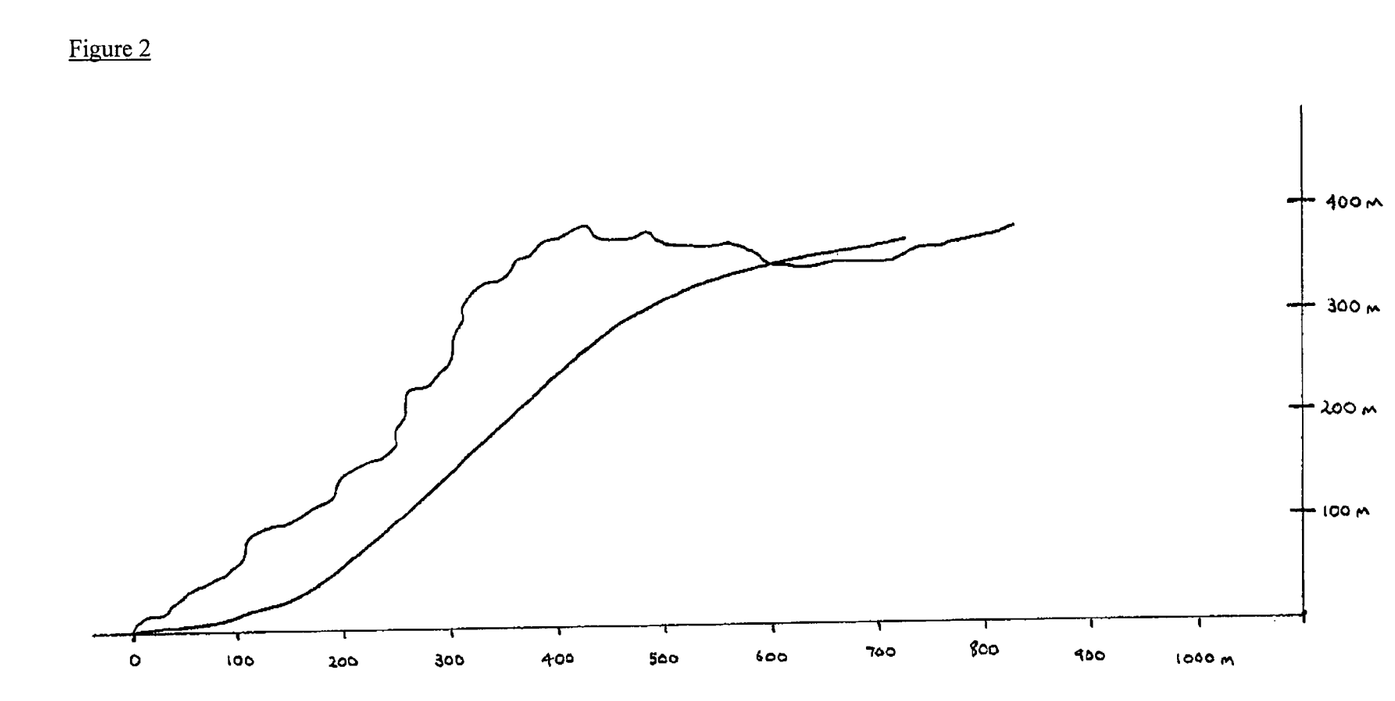
FIG. 2 shows (lower line at x=0-400) a plot of distance against height for tunnel 20 and thus angle to the horizontal, which varies between 22 and 35 degrees and (upper line at x=0-400) the elevation of waterfall 40. X-axis shows distance in meters from underground power cavern 10. Y-axis shows vertical height in meters above $h_2$.

By having tunnel 20 at an angle of 23.5 degrees, each section of pressure piping that is inserted is supported primarily by the rock/ground underneath it and not by the section of pressure piping below it. This prevents excessive compressive force being exerted upon the sections of pressure piping and helps reduce construction costs by the use of friction to reduce the weight that needs to be held during building.

The directional driller is then used to define a tunnel from power cavern 20 to river 70 at the base of waterfall 40, and piping is inserted into tunnel 30 and sealed to define a second conduit 30. In power cavern 10, the end of pressure piping from tunnel 20 is connected to piping in the power cavern via a valve to allow for shut-off of water flow from within the power cavern 10, and a sump is also provided to allow for collection of solids. Thus, solids can be removed from the sump by shutting the valve and opening the sump. Once the sump has been replaced and sealed, the valve can be reopened. After the valve and sump, a Pelton turbine installation is provided for electricity generation. Water exits the Pelton turbine installation and exits power cavern 10 along piping in second tunnel 30 to river 70 at the base of waterfall 40.

Thus, a fluid flow path is defined from penstock 50 along the first conduit to Pelton turbine installation to the second conduit and terminating at river 70 at the base of waterfall 40.

The directional driller is then used to define a tunnel 80 from power cavern 10 to a power grid (not shown) along which electricity cabling is placed to connect the Pelton turbine installation to the power grid.

Finally, digging equipment is used to place penstock 50 in fluid flow communication with the adjacent river 70. Thus, river 70 at height $h_1$ is in fluid flow communication with river 70 at height $h_2$ via the first conduit, Pelton turbine installation and second conduit.

With a 400 meter "head of water" and a flow of 1 cubic meter of water per second passing into the first conduit via penstock 50, Pelton turbine installation generates 2 Megawatts of electricity, and the impact upon water flow to waterfall 40 is not too great, with at least 80% of the water flow continuing to waterfall 40. As water flow along river 70 at height $h_2$ changes with the seasons and rainfall, penstock 50 can be adjusted remotely to reduce or increase water flow to the first conduit as appropriate.

In an alternative embodiment (not shown) the same arrangement of a first conduit having a "head" of 400 meters is provided, and dimensioned with a one to two meter internal diameter allowing for a flow of 1.75 cubic meters of water per second, Pelton turbine installation generating 3.7 MW of electricity.

Calculations of power output by embodiments of the present invention are made using the equation:

$$\text{Power output (kW)} = 9.8 \text{ (acceleration due to gravity)} \times \text{water flow (m}^3\text{/s)} \times \text{head (meters)} \times \text{efficiency (\%)}$$

The above two examples are calculated with a system efficiency of approximately 50%, as are the values given in Table 13. However, that is a highly conservative estimate and an efficiency of up to 80-90% can be expected with efficient turbine use.

An access tunnel are then provided to the side of power cavern 10, and a roof of reinforced concrete paneling is then placed on top of power cavern 10, and earth is then placed on top so that plants can grow on top of it and its environmental impact minimised.

Thus, the only parts of the hydroelectric power generation system 100 which are visible from the surface are penstock 50, the access tunnel to power cavern 10 and (remote from the site of power cavern 10) the end of tunnel 80 where it connects to the power grid. Hence, the environmental impact (particularly the visual impact) of the hydroelectric power generation system 100 is minimised, whilst providing a substantial and valuable source of electricity.

In order to facilitate management of the hydroelectric power generation system 100, optical communication cabling is run alongside the electricity cabling in tunnel 80 and is connected with the computerised management systems of the hydroelectric power generation system 100 such that remote management can be achieved.

The accompanying tables and results provide data comparing the power output and environmental impact of the present invention to that of existing hydroelectric power generation systems.

Figure 3:
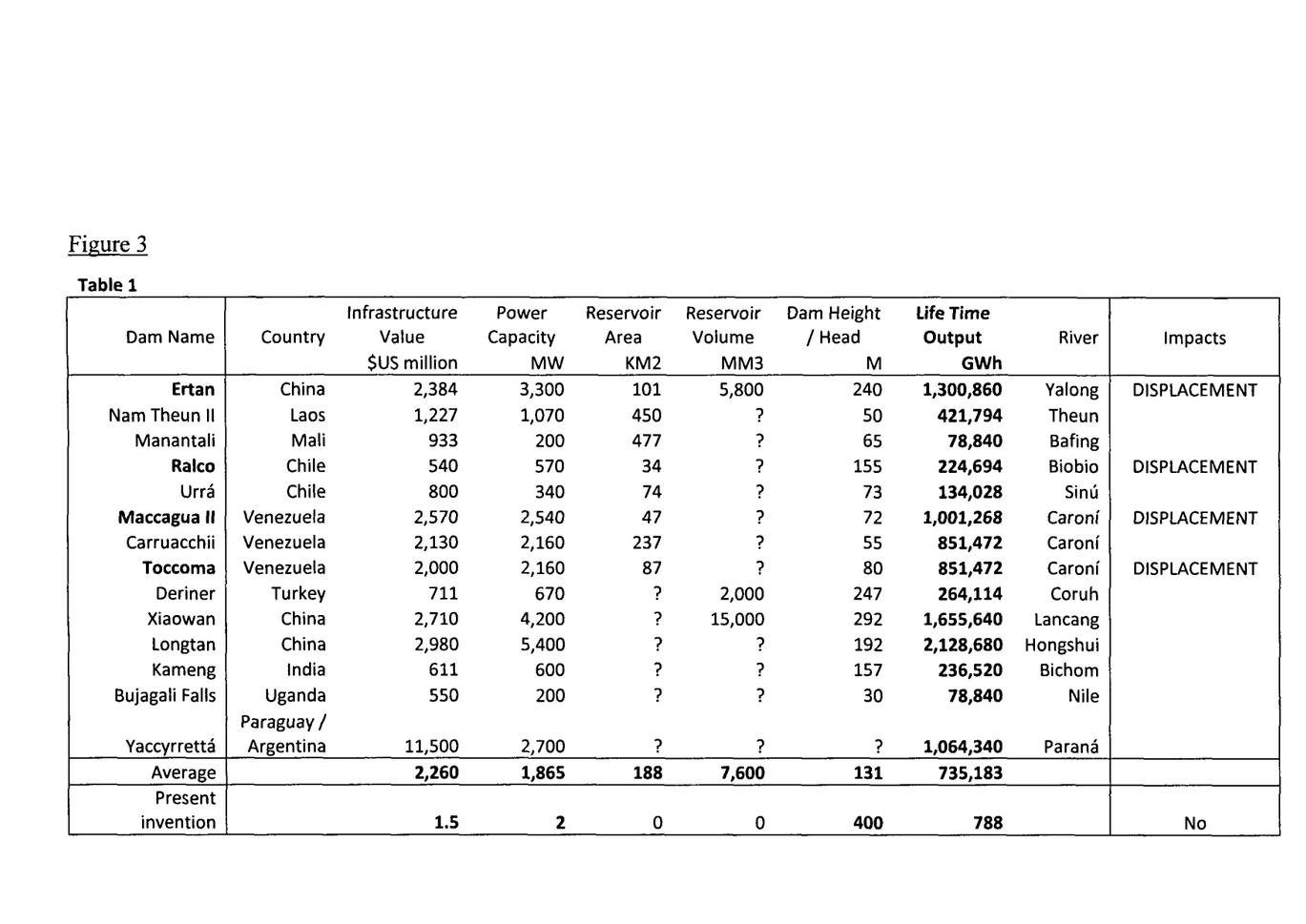
Figure 6:
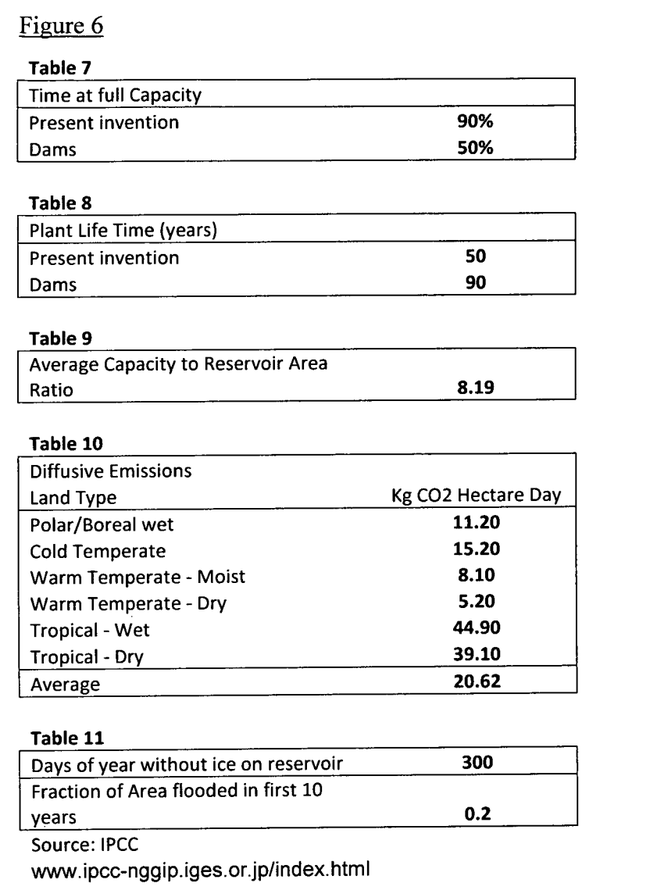

Lifetime power output shown in Table 1 is calculated as power capacity*24*365*plant lifetime in years (Table 8)*time at full capacity (Table 7)/1000.

Figure 5:
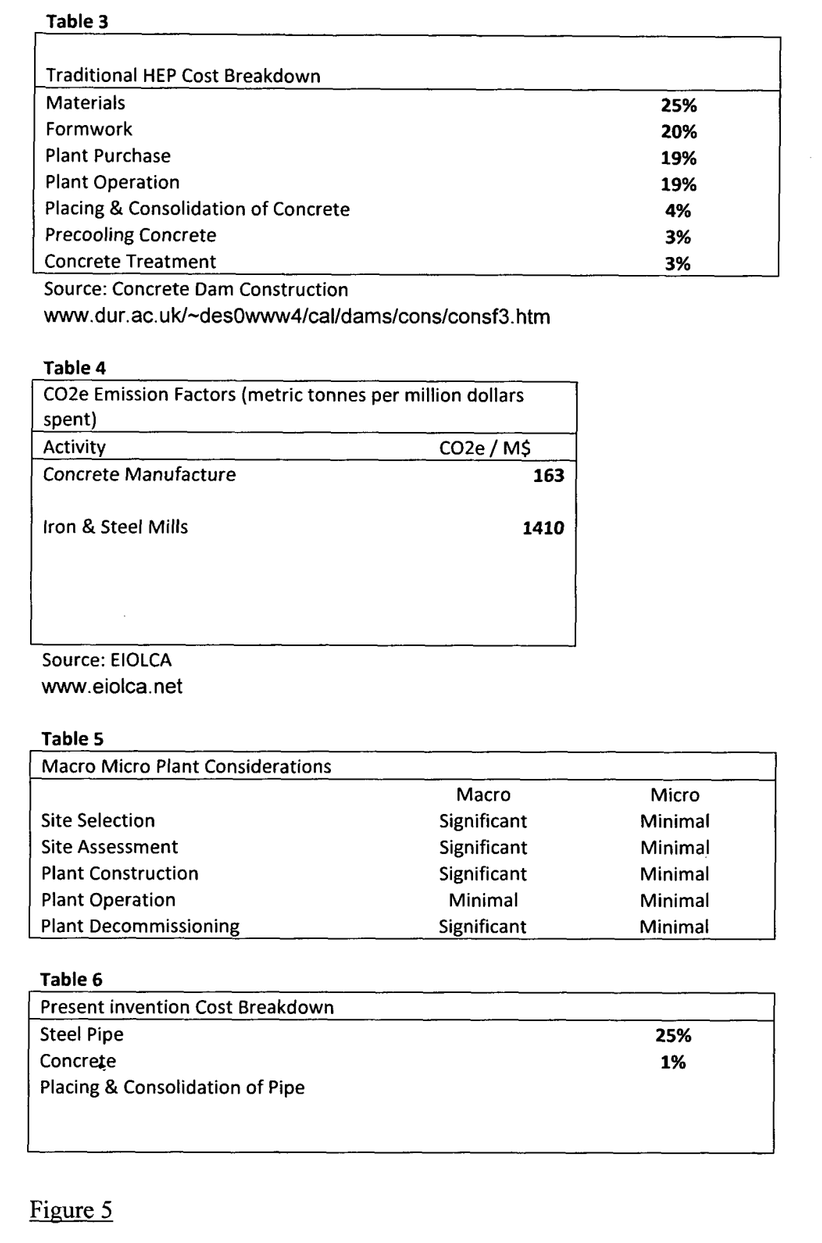

Estimate upstream $CO_2e$ (Table 2) is calculated as (concrete value (Table 2)*$CO_2e$ emission (metric tonnes per million dollars) (Table 4))+(steel value (Table 2)*$CO_2e$ emission (metric tonnes per million dollars) (Table 4)).

Direct $CO_2$ (Table 2) is calculated as (((average diffusive emissions (Table 10)*100)*reservoir area (Table 2))*days of year without ice on reservoir (Table 11)*plant lifetime (years) (Table 8)*fraction of area flooded in first ten years (Table 11))/1000.

Total $CO_2$ (Table 2) is calculated as Estimate upstream $CO_2e$ (Table 2)+Direct $CO_2$ (Table 2).

Figures for the present invention are based upon a concrete and steel infrastructure value of USD 1.5 M, a 2 MW power capacity, and a head of 400 meters.

Figure 11:
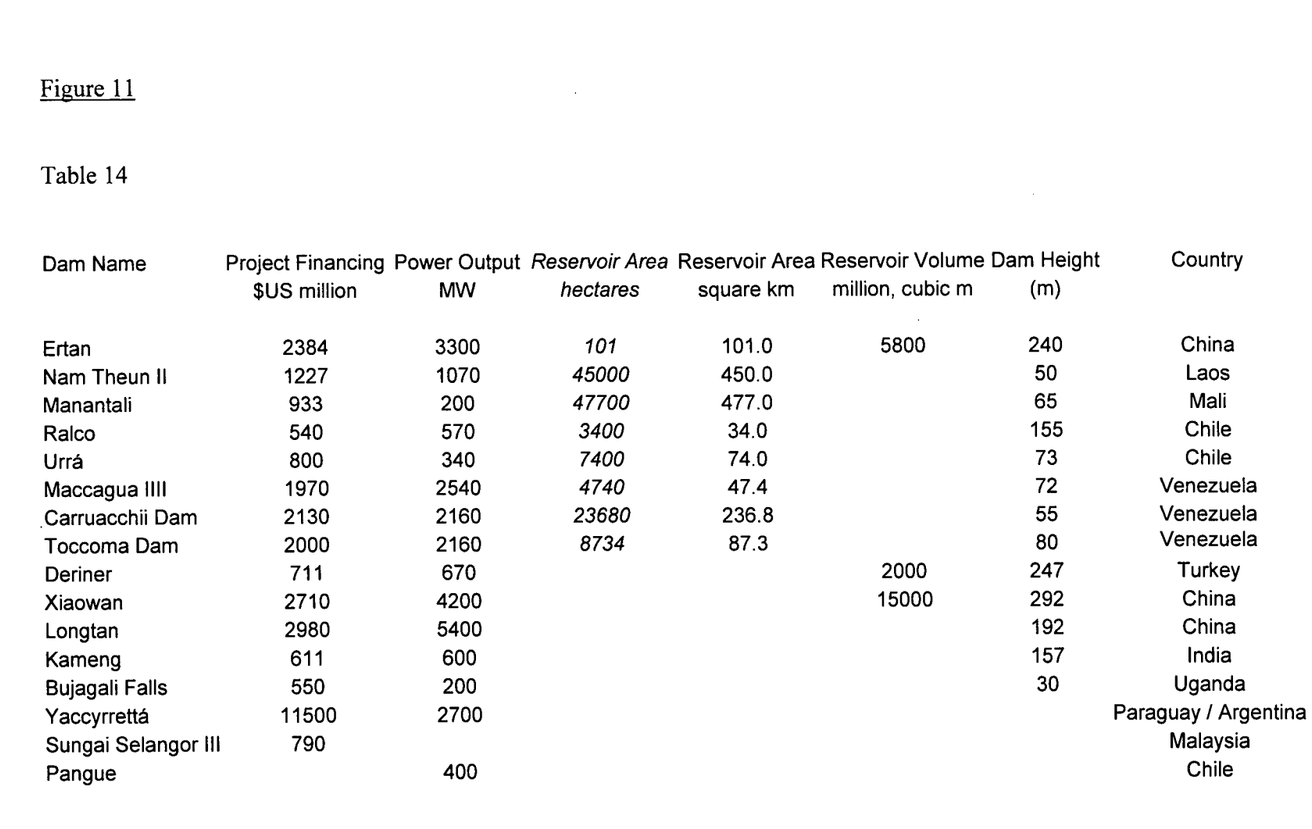
FIG. 11 shows Table 14 which details the power output in MW as compared to the project financing value in $US million for a range of hydroelectric power generation facilities—data from assets.panda.org/downloads/aidenvdamfinancereport.pdf.

As can be seen from FIG. 11, the capital cost compared to the power output is highly favourable when compared to a range of existing hydroelectric power generation facilities.

Figure 7:
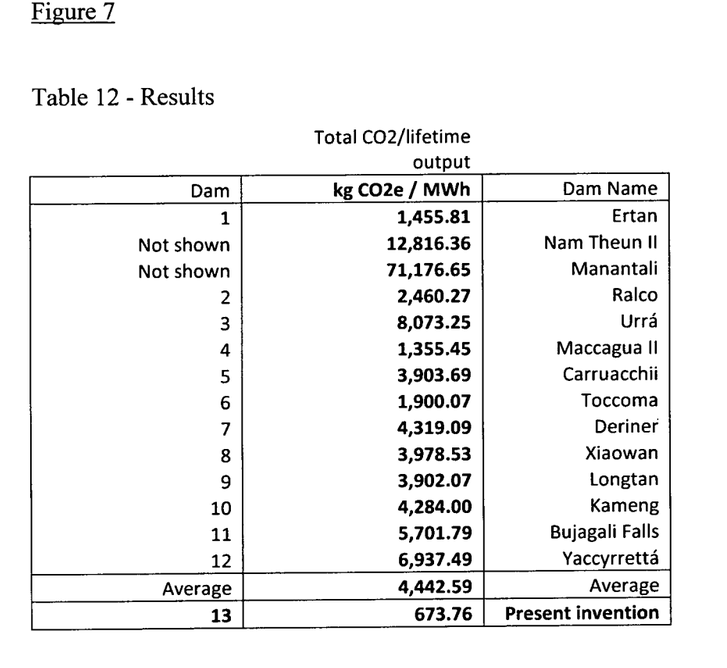
FIG. 7 shows results (Table 12) for the various dams and the hydroelectric power generation system of the present invention.
Figure 8:
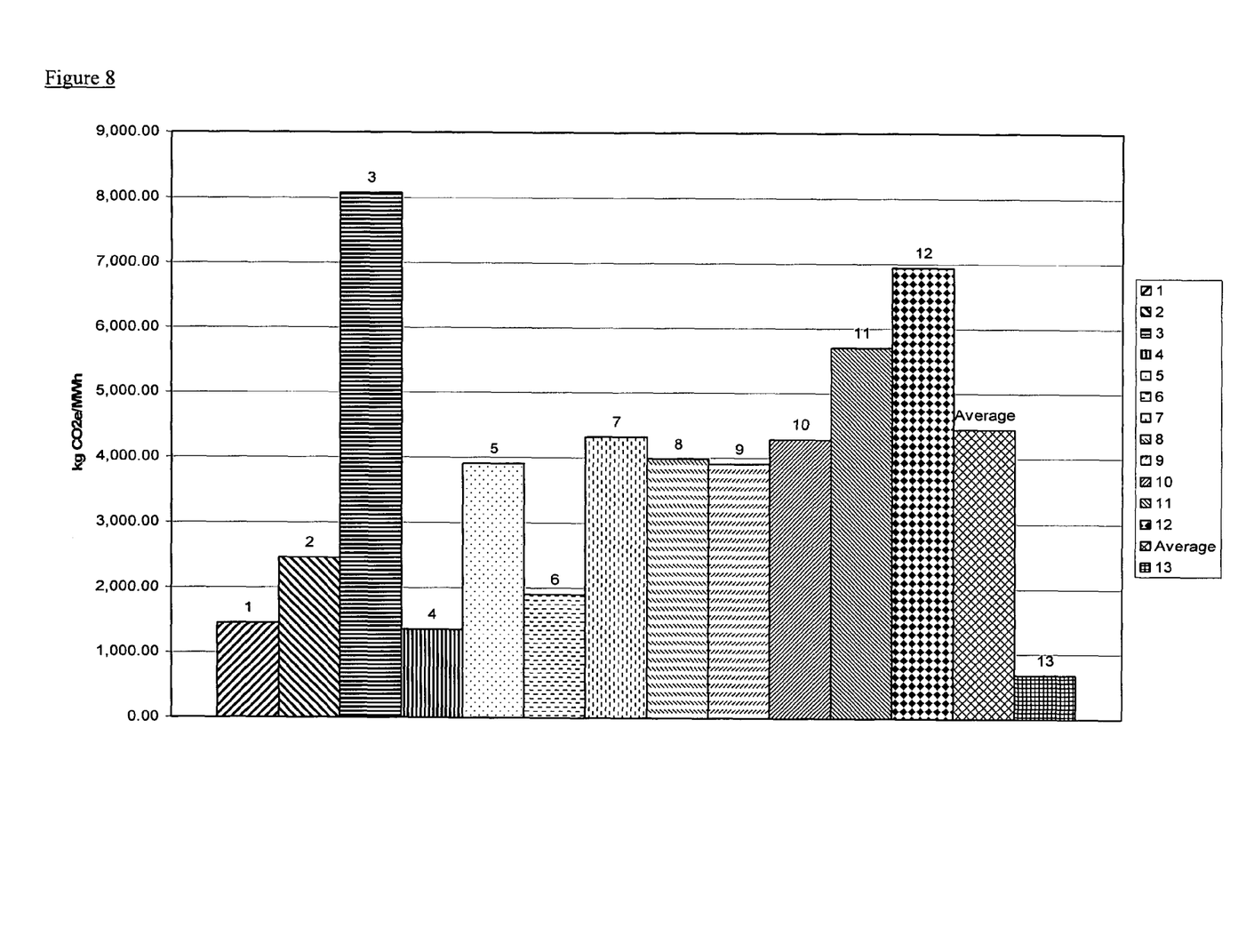
FIG. 8 graphically shows the results detailed in the results table (FIG. 7)

As can be seen from the results Table and the accompanying Results figure, the hydroelectric power generation system of the present invention substantially outperforms prior art systems in terms of the total $CO_2$ output per megawatt hour of power generated over the lifetime of the system. Indeed, the figures are more than twice as good as those of the nearest dam, about six times that of the average dam and almost one hundred times better than that of the worst dam. It should also be noted that these figures are calculated assuming that a conventional dam has a lifespan of 90 years whereas a system of the present invention will only achieve a lifespan of 50 years. As such, the figures are extremely conservative and would obviously be substantially better if the same lifespan were attributed to both types of system.

It will be appreciated that it is not intended to limit the present invention to the above example only, other forms being readily apparent to one skilled in the art without departing from the scope of the appended claims.

The invention claimed is:

1. A method of construction of a hydroelectric power generation system in an environment comprising a water source which flows from a first height to a second height, the first height being at least 10 meters above the second height, the method comprising the steps of:
   (i) constructing an underground power cavern at a location adjacent said water source at said second height, said underground power cavern having a removable roof covering;
   (ii) performing directional drilling to define a first tunnel from said underground power cavern to a water source location at or adjacent said water source at said first height, said first tunnel having a diameter no greater than 6 meters;
   (iii) installing piping in said first tunnel to define a first conduit which in-use conveys water from said water source location to said underground power cavern;
   (iv) constructing a second conduit from said underground power cavern to said water source at or below said second height;
   (v) performing directional drilling to define a second tunnel from said underground power cavern to a power grid;
   (vi) installing an at least one electricity generating turbine in said underground power cavern in fluid flow communication with said first tunnel and said second conduit;
   (vii) installing an at least one electricity cable in said second tunnel connecting said at least one electricity generating turbine to said power grid; and
   (viii) when said water source location is not in fluid flow communication with said water source at said first height, placing said water source location in fluid flow communication with said water source at said first height.

2. The method according to claim 1, wherein the first height is at least 50 meters above the second height.

3. The method according to claim 2, wherein the first height is at least 100 meters above the second height.

4. The method according to claim 3, wherein the first height is at least 200, 250, 300, 350, 400, 450, 500, 550 or 600 meters above the second height.

5. The method according to claim 1, wherein the first conduit has a flow capacity of at least 1 $m^3$ per second.

6. The method according to claim 1, wherein the first conduit has a maximum flow capacity of less than 2 $m^3$ per second and the first tunnel defines an average angle from horizontal of between 22-45 degrees between said water source and said underground cavern.

7. The method according claim 1, wherein the water source at the first height is a free running water source.

8. The method according to claim 1, wherein the water source at the first height is a river.

9. The method according to claim 1, additionally comprising the step of defining a penstock at said water source location.

10. The method according to claim 1 wherein the first conduit has a flow capacity of at least 1 $m^3$ per second and wherein the first height is at least 50, 100, 150, 200, 250, 300, 350, 400, 450, 500, 550 or 600 meters above the second height.

11. The method according to claim 10 wherein the first conduit has a maximum flow capacity of less than 2 $m^3$ per second.

12. The method according to claim 10 wherein the water source at the first height is a free running water source and the first tunnel defines an average angle from horizontal of between 22-45 degrees between said water source and said underground cavern.

13. The method according to claim 11 wherein the water source at the first height is a free running water source.

14. The method according to claim 10 wherein the water source at the first height is a river.

15. The method according to claim 11 wherein the water source at the first height is a river.

16. The method according to claim 12 wherein the water source at the first height is a river.

17. The method according to claim 10, additionally comprising the step of defining a penstock at said water source location.

18. The method according to claim 12, additionally comprising the step of defining a penstock at said water source location.

19. A hydroelectric power generation system in an environment comprising a water source which flows from a first height to a second height, the first height being at least 10 meters above the second height, the hydroelectric power generation system comprising:
   (i) an underground power cavern at a location adjacent said water source at said second height, said underground power cavern having a removable roof covering;
   (ii) a first tunnel from said underground power cavern to a water source location at or adjacent and in fluid flow communication with said water source at said first height, said first tunnel having a diameter no greater than 6 meters;
   (iii) piping in said first tunnel to define a first conduit which in-use conveys water from said water source location to said underground power cavern;
   (iv) a second conduit from said underground power cavern to said water source at or below said second height;
   (v) a second tunnel from said underground power cavern to a power grid;
   (vi) an at least one electricity generating turbine in said underground power cavern in fluid flow communication with said first tunnel and said fluid flow path; and
   (vii) an at least one electricity cable in said second tunnel connecting said at least one electricity generating turbine to said power grid.

20. The hydroelectric power generation system of claim 19 wherein said water source at said first height further defines a penstock.

\* \* \* \* \*